United States Patent [19]

Hess

[11] 4,023,200
[45] May 10, 1977

[54] CIRCUIT FOR COMBINING THE THREE COLOR SIGNALS OF A COLOR TELEVISION SYSTEM TO FORM TWO COLOR DIFFERENCE SIGNALS AND A LUMINANCE SIGNAL

[75] Inventor: Heinz Hess, Weiterstadt, Germany

[73] Assignee: Robert Bosch G.m.b.H., Stuttgart, Germany

[22] Filed: Sept. 24, 1975

[21] Appl. No.: 616,411

[30] Foreign Application Priority Data

Sept. 28, 1974 Germany .......................... 2446538

[52] U.S. Cl. .................................... 358/30; 358/50
[51] Int. Cl.² ...................... H04N 9/52; H04N 9/09
[58] Field of Search ........................ 358/30, 50, 41; 330/30 R

[56] References Cited
UNITED STATES PATENTS

| | | | |
|---|---|---|---|
| 3,429,987 | 2/1969 | Altmann | 358/30 |
| 3,597,639 | 8/1971 | Harwood | 358/30 X |
| 3,639,685 | 2/1972 | Morio | 358/30 |
| 3,663,745 | 5/1972 | O'Toole | 358/30 |
| 3,715,470 | 2/1973 | Craig | 358/30 |

Primary Examiner—Robert L. Richardson
Assistant Examiner—Aristotelis M. Psitos
Attorney, Agent, or Firm—Michael J. Striker

[57] ABSTRACT

The red, green and blue color signals are, respectively, applied to the base of three transistors, each connected as a common emitter stage. A constant current source has an output terminal connected to that side of the emitter resistors not connected to the respective emitter. The conductivity of the emitter resistors is proportional to the coefficients in the equation $Y = k1 \cdot R + k2 \cdot G + k3 \cdot B$ where $Y$ is the luminance signal. For the PAL system, the color difference signals are then derived from the collector of the emitter follower stage receiving the red and green signals and the luminance signal is derived at the constant current output terminal. For the NTSC system, the same signals are derived from the same terminals, but an additional coupling resistor is added between the emitter of the transistor receiving the blue signal and the other two emitters.

4 Claims, 1 Drawing Figure

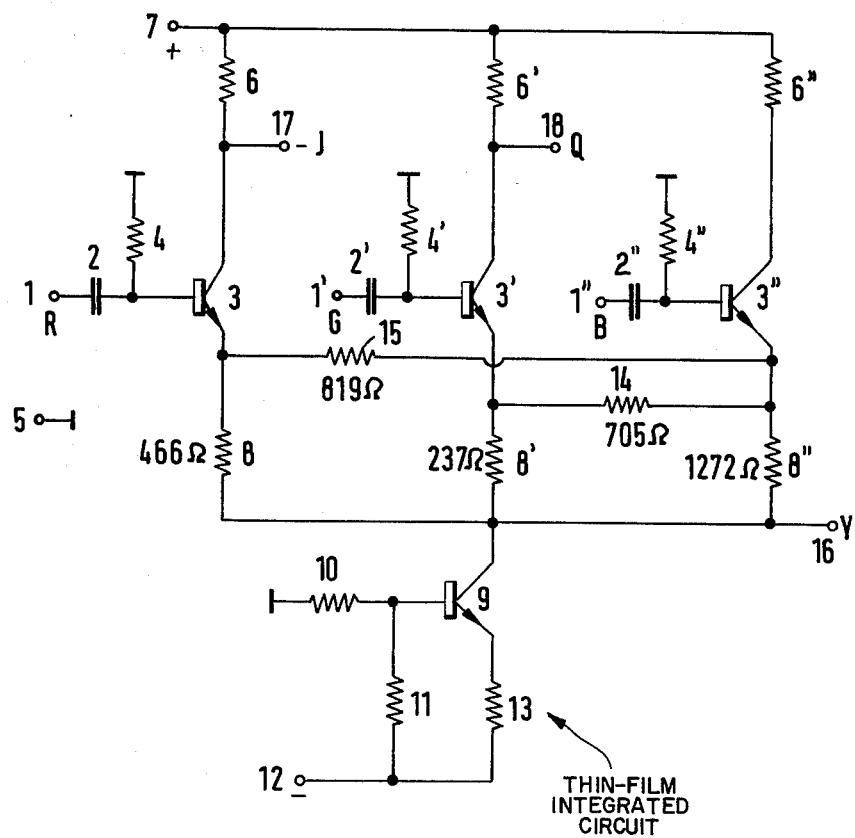

CIRCUIT FOR COMBINING THE THREE COLOR SIGNALS OF A COLOR TELEVISION SYSTEM TO FORM TWO COLOR DIFFERENCE SIGNALS AND A LUMINANCE SIGNAL

BACKGROUND OF THE INVENTION

The present invention relates to circuits for forming matrixes combining three color signals R, G and B into color difference signals $-$ I and Q in accordance with the NTSC color television system. It is also desired to derive a luminance signal $Y=k1.R+k2.G+k3.B$ from the three color signals.

In NTSC color television systems, the color information is transmitted by two color difference signals I and Q while the luminance information is transmitted by way of a luminance signal Y. Matrixes are provided to combine the three color signals R, G and B into the two color difference signals and the luminance signal. The equation for the luminance signal is $Y=0.30R+3.59G+0.11B$. Starting with this equation, the two color difference signals I and Q have been set as follows:

$$I = 0.74 (R-Y) -0.27 (B-Y) \text{ and}$$
$$Q = 0.48 (R-Y) +0.41 (B-Y)$$

By transformation, the following two color difference equations may be derived:

$$-I = 0.60 R +0.28 G +0.32 B \text{ and}$$
$$Q = 0.21 R -0.52 G +0.31 B$$

A circuit is shown in the book of P.S. Carnt and G.B. Townsend: "Colour Television", on page 161. This is a circuit for deriving both the color difference signals and the luminance signals from the R, G and B signals. Howeverthe circuit requires a great many components. Specifically 9 matrix resistors and 2 inverter stages are required for implementing the coefficients required by the matrix equations. The same number of resistors and inverter stages are required in a circuit shown on page 51 of the book by M. Kaufman and H. Thomas: "Introduction to Color TV". In this book, the luminance signal is derived from the equation $Y = 0.30 R + 0.59 G + 0.11 B$, while the color difference signals I and Q are derived from the equations $$I = 0.74 (R-Y) -0.27 (B-Y) \text{ and}$$
$$Q = 0.48 (R-Y) +0.41 (B-Y).$$

SUMMARY OF THE INVENTION

It is an object of the present invention to furnish a matrix circuit for both the PAL and NTSC color television system which requires a lesser number of components.

In accordance with the present invention, a constant current source is furnished which has a first output terminal. Three transistor stages are also furnished, each connected as common emitter stage. The red, green and blue color television signals are applied, respectively, to the bases of the three transistors. The output terminal of the constant current source is connected to the side of the three emitter resistors which are connected to the respective emitters. The conductivity values of the emitter resistors are such that they are mutually proportional in the ratios determined by the matrix coeffients in the luminance signal equation. For the PAL system, the color difference signal is then derived from the collectors of the transistors receiving the red, blue and green signals. The luminance signal is derived at the output terminal of the constant current source. In order to furnish the corresponding signals for the NTSC system, two additional coupling resistors to couple the emitter of the transistor receiving the B signal to each of the remaining emitters are provided.

The circuit according to the present invention has the advantage that only five matrix resistors are required. Further, the allowable tolerance for the resistors is changed from 0.2% to 0.5%. Further, the compensation elements previously required for setting the white balance are eliminated, since, for white ($R=G=B$) the equations automatically implement $-I = 0$ and $Q = 0$.

The novel features which are considered as characteristic for the invention are set foth in particular in the appended claims. The invention itself, however, both as to its construction and its method of operation, together with additional objects and advantages thereof, will be best understood from the following description of specific embodiments when read in connection with the accompanying drawings.

Brief Description of the Drawing

The single FIGURE is a schematic diagram of the circuit of the present invention.

Description of the Preferred Embodiments

A preferred embodiment of the present invention will now be described with reference to the drawing.

The red signal, namely the signal of the red color component image is applied at a terminal 1 and through a coupling capacitor 2 to the base of a transistor stage having a transistor 3. The transistor stage having transistor 3 is connected as common emitter stage. The base of transistor 3 is connected to ground potential through a resistor 4. Ground potential is labelled 5. The resistor 4 serves to set the operating point of transistor 3. The collector of transistor 3 is connected through a resistor 6 to a positive voltage 7. An emitter resistor 8 is connected to the emitter of transistor 3. Similarly the green signal (G) is applied at a terminal 1' and through a capacitor 2' to the base of a transistor 3'. The base of transistor 3' is connected through a resistor 4' to ground potential. The collector of transistor 3' is connected through a resistor 6' to the positive supply source 7, while its emitter resistor 8' is connected to the corresponding terminal of the abovementioned resistor 8. The blue signal B is similarly applied to a terminal 1'' through a coupling capacitor 2'' to the base of a transistor 3''. Again, the collector resistor 6'' has one terminal connected to the positive supply source 7, while the terminal of an emitter resistor 8'' which is not connected to the emitter of transistor 3'' is connected in common with the corresponding terminal of resistors 8 and 8'.

A constant current source, namely a source furnishing a current whose amplitude is substantially independent of the load, has an output terminal connected to the common point of resistors 8, 8' and 8''. The base of transistor 9 is connected to ground potential through a resistor 10 and is connected to a source of negative voltage 12 through a resistor 11. The emitter of transistor 9 is connected through a resistor 13 to the negative voltage source 12. Further, the emitter of transistor 3'' is connected through a resistor 14 to the emitter of transistor 3'' and through a resistor 15 to the emitter of transistor 3.

In order to explain the functioning of this circuit, let it be assumed that resistors 8, 8' and 8" are equal and that the color signals applied at terminals 1, 1' and 1" all have the same amplitude. Further it is to be assumed that resistors 14 and 15 each have an infinte resistance. Under these conditions, one-third of the current delivered by the constant current source will flow through the emitter-collector circuit of each of the transistors. Correspondingly, the signals at the collectors of the individual transistors will all be equal. If it is now assumed that the ratio of the conductivities of emitter resistors 8, 8' and 8" are proportional to the matrix coefficients $kl = 0.30$, $k2 = 0.59$ and $k3 = 0.11$, then the signal at the output terminal of the constant current source (terminal 16) will be a signal corresponding to the luminance signal $Y = 0.3 R + 0.59 G + 0.11 B$. Further, the signal at the collector of transistor 3 (at terminal 17) will be the negative color difference signal $-(R-Y)$, while the signal at terminal 18 (collector of transistor 3') will be a negative color difference signal $-(G-Y)$. Similarly the signal at the collector of transistor 3" will be a negative signal $-(B-Y)$. The correct white balance is automatically achieved, since the luminance signal is applied to each of the color difference stages through a negative feedback resistor 8, 8' and 8" respectively which is also effective in determining the amplification of the individual color signals R, G and B.

If the matrix circuit of the present invention is utilized in PAL coding systems, then the color differencesignal V can be derived from terminal 17 and the color difference signal U from terminal 18. However, for NTSC color television systems, the I-Q coordinate system must be rotated relative to the U-V coordinate system of the Pal systems by 33°. In order to achieve this coordinate rotation, the three color difference signals at the emitters of the transistors 3, 3' and 3" are intercoupled by resistors 14 and 15. This intercoupling causes the coordinate system to be rotated by the desired 33°, if the emitter resistors and the coupling resistors have the correct relationship. Thus for emitter resistor 8 = 466 ohms, 8' = 237 ohms, 8" = 1272 ohms, resistor 14 must be 705 ohms and resistor 15 819 ohms. Under these conditions the $-I$ color difference signal required for the NTSC color television system can be derived at terminal 17, while the correct color difference signal Q for this system can be derived at terminal 18. In a particularly preferred embodiment of the present invention the active and passive circuit elements of the above-described matrix circuit are arranged on the substrate of an integrated circuit and preferably an integrated circuit utilizing a thin film technique. This results in circuits which are particularly insensitive to temperature variation.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A matrixing circuit for NTSC color television systems operative for receiving R, G and B color signals and deriving therefrom each of the requisite NTSC color difference signals $-I$ and Q and also the NTSC luminance signal Y, the matrixing circuit comprising a voltage source having first and second source terminals; a first, a second and a third transistor each having a base, a collector and an emitter, the first, second and third transistors being respectively adapted to receive at their bases the R, G and B color signals, the collectors of the three transistors being all connected to the first source terminal; a first, a second and a third emitter resistor each having one terminal connected to the emitter of a respective one of the three transistors, the three other terminals of the emitter resistors being connected in common to a common junction; a constant current source connected between said common junction and said second source terminal, the conductivities of the three emitter resistors standing in the ratio $k_1:k_2:k_3'$, where $k_1$, $k_2$ and $k_3$ are the coefficients in the NTSC luminance signal equation $Y = k_1R + k_2G + k_3B$, so that an NTSC luminance signal Y develops at said common junction upon application of R, G and B color signals to the bases of the first, second and third transistors, respectively; and a first phase shift resistor connected between the emitters of the first and third transistors and a second phase shift resistor connected between the emitters of the second and third transistors, the first and second phase shift resistors having resistance values such as to cause the development of the NTSC color difference signals $-I$ and Q at the collectors of the first and second transistors, respectively, upon applicaton of R, G and B color signals to the bases of the first, second and third transistors, respectively.

2. The matrixing circuit defined in claim 1, the matrixing circuit being an integrated circuit.

3. The matrixing circuit defined in claim 1, the matrixing circuit being a thin-film integrated circuit.

4. The matrixing circuit defined in claim 1, further including a first, a second and a third collector resistor, the collectors of said first, second and third transistors being connected to said first source terminal by respective ones of said first, second and third collector resistors.

* * * * *